J. W. Gardner,
Knife Handle.
Nº 22,795.          Patented Feb. 1, 1859.
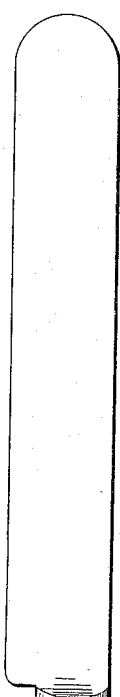
Fig. 1
Fig. 2
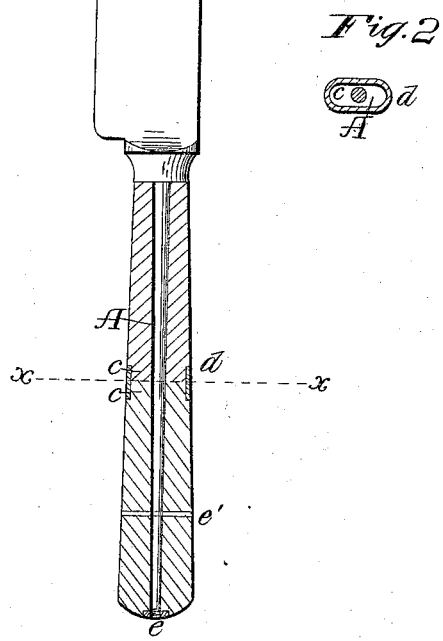

UNITED STATES PATENT OFFICE.

JOSEPH W. GARDNER, OF SHELBURNE FALLS, MASSACHUSETTS.

HANDLE FOR TABLE-CUTLERY.

Specification forming part of Letters Patent No. 22,795, dated February 1, 1859; Reissued March 8, 1859, No. 671.

*To all whom it may concern:*

Be it known that I, JOSEPH W. GARDNER, of Shelburne Falls, in the county of Franklin and State of Massachusetts, have invented a new and useful Improvement in the Construction of Handles for Table-Cutlery; and I do hereby declare that the following is a clear and exact description of the same, reference being had to the annexed drawings, making a part of this specification, in which—

Figure 1 is a view of a case or table knife having a handle constructed in my improved way, the handle being bisected longitudinally. Fig. 2 is a transverse section of the handle taken in the line ($x$) ($x$) Fig. 1.

Similar letters of reference indicate corresponding parts in the two figures.

The object of this invention is to render available for the construction of the handles of table cutlery, small pieces of stock, which being incapable hitherto of being worked up, have been sold by cutlers for a mere trifle, to manufacturers of smaller articles. Ivory and horn are the materials chiefly used for the purpose mentioned and these articles have of late increased so very materially in price that the cost of table cutlery has been greatly enhanced. Cutlers have directed their attention to other articles or materials and various compositions have been used, but the old materials are still preferred for good cutlery, are the most durable and consequently the most salable and will doubtless continue to be so provided the cost of the articles mentioned will not too greatly augment the cost of the cutlery.

To enable those skilled in the art to fully understand and construct my invention I will proceed to describe it.

I construct the handles of two or more parts ($a$) ($b$) as shown in Fig. 1. The handles may be constructed in any of the usual forms, and may be described as being an ordinary handle divided transversely into two parts ($a$) ($b$). The inner ends of the two parts ($a$) ($b$) have tenons ($c$) ($c$) formed on them, and a ferrule ($d$) encompasses the tenons. This ferrule may be constructed of metal.

A represents the tang of the knife. This tang extends entirely through the two parts ($a$) ($b$), a screw thread is cut on its lower end and a nut ($e$) is screwed thereon or, a washer may be used instead of a nut and the end of the tang riveted or headed over it, the washer being fitted in a recess in the end of the handle. Instead of the nut ($e$) a rivet ($e'$) may pass transversely through the part ($a$) of the handle and tang A. By this improvement the handle is equally as strong as if it were formed of one piece and the ferrule ($d$) is rather ornamental than otherwise and adds to the appearance of the handle. It will be understood of course that the improvement applies to the handles of forks as well as knives, and that the improvement is not confined to any particular material used as stock.

Having thus described my invention, I claim and desire to secure by Letters Patent, as an improved article of manufacture—

A table knife, having its handle composed of two or more parts ($a$, $b$) the ends of which are encompassed by ferrules ($d$), and otherwise constructed as herein shown and described.

JOSEPH W. GARDNER.

Witnesses:
FREDERIC A. BALL,
WM. S. HEATH.

[FIRST PRINTED 1911.]